Figure 10:
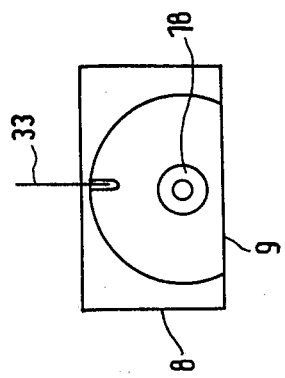

United States Patent [19]

Hellstab

[11] 4,389,656

[45] Jun. 21, 1983

[54] MULTIPLE ELECTRODE SYSTEM

[75] Inventor: Stephan Hellstab, March-Holzhausen, Fed. Rep. of Germany

[73] Assignee: Hugo Sachs Elektronik KG, Fed. Rep. of Germany

[21] Appl. No.: 252,734

[22] Filed: Apr. 10, 1981

[30] Foreign Application Priority Data

Apr. 10, 1980 [DE] Fed. Rep. of Germany ....... 3013773

[51] Int. Cl.³ .......................................... G01D 15/08
[52] U.S. Cl. ................................................ 346/139 C
[58] Field of Search .................... 346/139 C, 162, 165; 29/592, 603

[56] References Cited

U.S. PATENT DOCUMENTS

| | | | |
|---|---|---|---|
| 2,966,726 | 1/1961 | Gallentine et al. | 29/592 |
| 4,052,714 | 10/1977 | Peterson | 346/139 C X |
| 4,151,535 | 4/1979 | Uberbacher | 346/139 C |
| 4,323,927 | 4/1982 | Yvard et al. | 346/139 C X |

Primary Examiner—Donald A. Griffin
Attorney, Agent, or Firm—Pollock, Vande Sande & Priddy

[57] ABSTRACT

A multiple electrode apparatus comprising a stack of alternately arranged electrically insulating plates and electrically conductive plates, the insulating and conductive plates being comprised of substantially identical discs, each disc having a bore and being mounted on an electrically insulating mounting member, the discs being pressed together on the member by end pressure plates.

13 Claims, 12 Drawing Figures

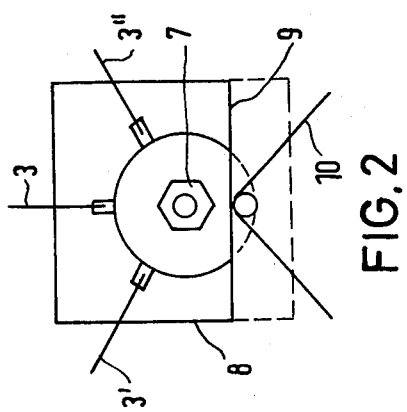
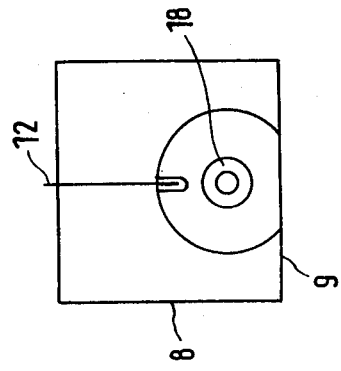
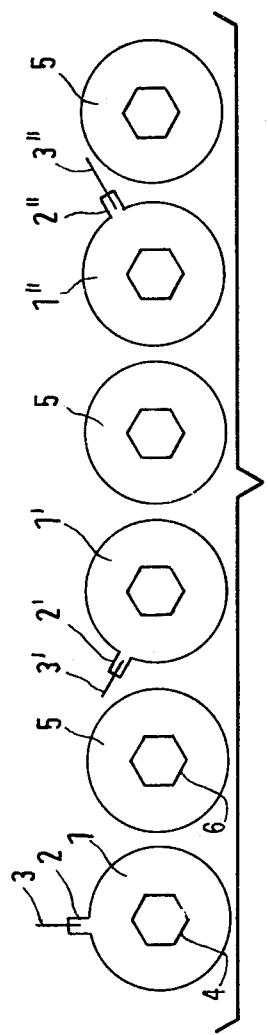
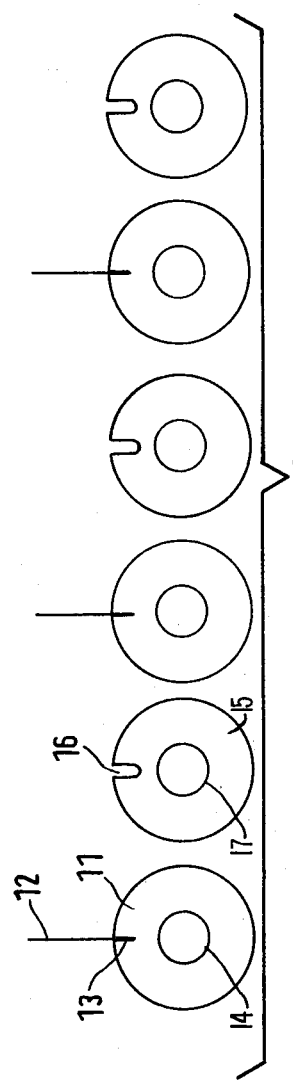

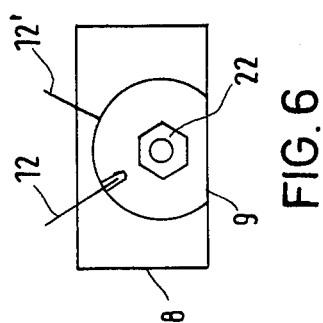
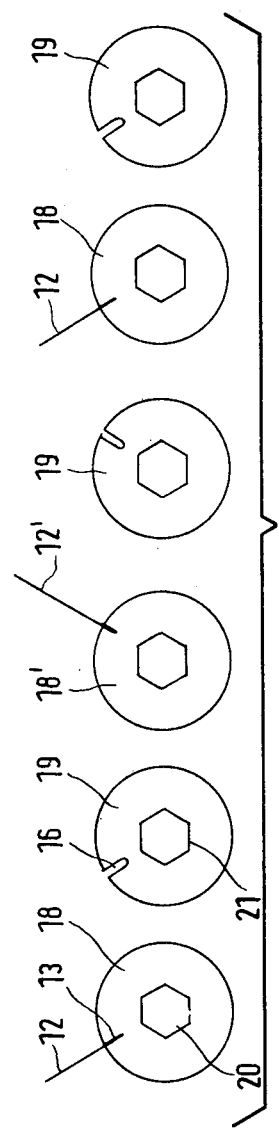
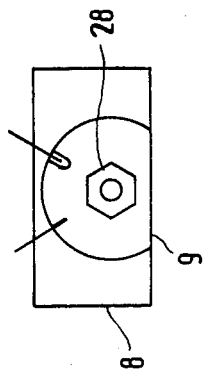
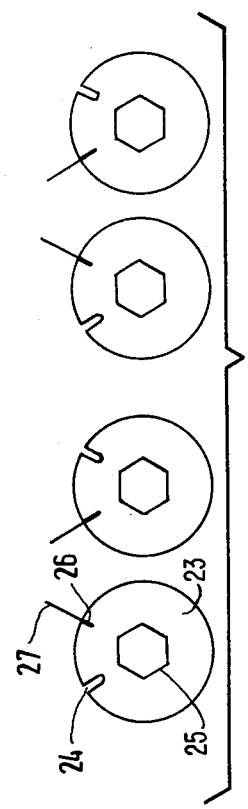

MULTIPLE ELECTRODE SYSTEM

The invention relates to a multiple electrode system comprising a stack of alternately arranged small electrically insulating plates and small electrically conductive plates, the latter being individually connected via connecting lines to at least one contacting pressure plate.

Multiple electrode systems of the aforementioned type have already been proposed in which the small electrically conductive plates are provided with connecting lugs to which the connecting lines are welded or soldered. The connecting lugs of adjacent plates have different lengths and/or shapes, so that the lugs are arranged in stepped manner with respect to one another. Thus, conductive plates of different shapes must be juxtaposed. To prevent the connecting lugs of adjacent plates coming into contact with one another by bending, it is necessary for the insulating plates to have insulating lugs arranged between the connecting lugs. This in turn leads to insulating plates of different shape, so that the multiple electrode system has to be built up from a plurality of different small insulating plates and different small conductive plates, leading to correspondingly high labour costs. Due to the different lengths and shapes of the connecting lugs, it is difficult then or impossible to mechanize the soldering or welding of the connecting lines.

The problem of the invention is to so develop the multiple electrode system that it is formed from identical small insulating plates and identical small conductive plates.

This problem is solved by the features of claim 1. Advantageous developments can be gathered from the subclaims.

Embodiments of the invention are described hereinafter relative to the drawings, wherein show: FIG. 1 a view of a plurality of insulating and conductive disks according to a first embodiment in the order in which they are placed on the insulating cube.

FIG. 2 a front view of the stack of disks according to FIG. 1 placed on the insulating tube.

FIG. 3 disks according to a second embodiment in the arrangement of FIG. 1.

FIG. 4 a front view of juxtaposed disks according to FIG. 3.

FIG. 5 a disk arrangement according to FIG. 1 in a third embodiment.

FIG. 6 a front view corresponding to FIG. 2 of the third embodiment.

FIG. 7 disks according to a fourth embodiment in the arrangement of FIG. 1.

FIG. 8 a view according to FIG. 2 of the fourth embodiment.

Figure 9:
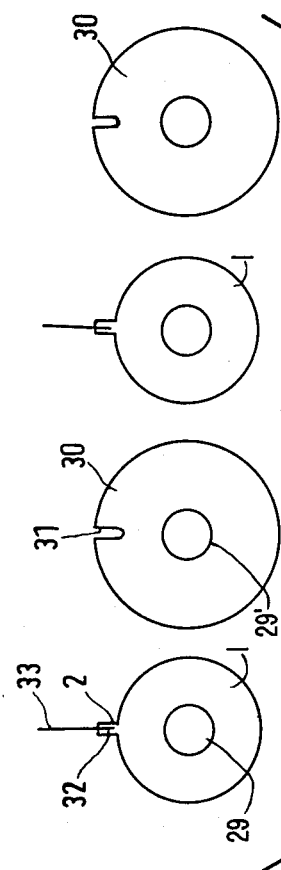

FIG. 9 a disk arrangement according to FIG. 1 in a fifth embodiment.

FIG. 10 a view according to FIG. 2 of the fifth embodiment.

Figure 11:
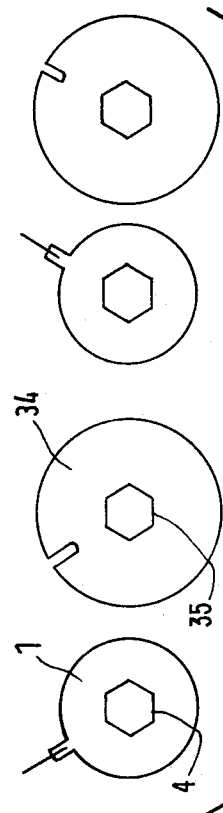

FIG. 11 an arrangement according to FIG. 1 of a sixth embodiment.

Figure 12:
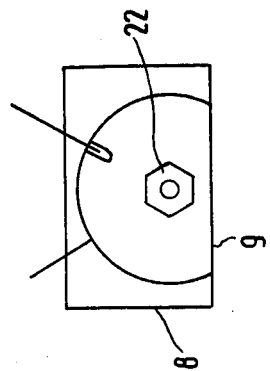

FIG. 12 a view according to FIG. 2 of the sixth embodiment.

According to FIGS. 1 and 2, the small electrically conductive plates comprise circular disks 1, having in each case a connecting lug 2 to which is welded or soldered a connecting line 3. These disks are made from steel and have, for example, a thickness of 0.1 mm. In the represented embodiment, disks 1 are provided with disk bores 4 having e.g. a hexagonal cross-section.

The electrically insulating disks 5 are also circular and have the same external diameter as disks 1. They are also provided with hexagonal bores 6.

The electrically conductive disks 1 are placed alternately with the insulating disks 5 on an insulating tube 7 in such a way that the lugs 2 are in each case displaced by 60° relative to one another between adjacent conductive disks 1. Thus, this means that lug 2 of the first conductive disk 1 points upwards, lug 2' of the following conductive disk 1' is displaced by 60° to the right and lug 2" is displaced by 60° to the left with respect to lug 2. This 60° displacement is repeated for the three following disks 1 in the same way.

The said displacement is clearly visible in FIG. 2. Connecting lines 3' are connected to each lug 2' and connecting lines 3" to each lug 2" by welding or soldering. The electrically insulating disks 5 are made from a plastics material, for example an epoxy resin fabric with a thickness of 0.2 mm.

A threaded rod is passed through the insulating tube 7 which has a hexagonal cross-section. Onto each of the ends of the threaded rod is screwed a pressure disk, so that the stack formed from the insulating disks 5 and the conductive disks 1 is firmly pressed together. This stack formed from disks 1 and 5 with the connecting lines 3 is subsequently cast with resin in the pressed together state so that a block 8 is formed. Connecting lines 3, 3' and 3" are led out of block 8. The bottom of the block is then ground giving a planar surface 9 on which are alternately arranged conductive disks 1 and insulating disks 5. A continuous metal paper strip 10 is fed along the surface 9. The conductive disks 1 are individually controllable by means of lines 3, making it possible to record analog and digital values on paper 10. The individual conductive disks are controlled in per se known manner by means of a decoder matrix.

Thus, by means of the aforementioned disks 1 and 4, it is possible to build up an electrode system having e.g. 250 electrodes in the form of disks 1 over a width of 80 mm.

In the embodiment of disks 3 and 4, connecting lines 12 are welded or soldered to the edge of in each case one side of the electrically conductive disks 11. The terminals of these lines are designated by 13. The conductive disks 11 are provided with a circular bore 14.

On the edge of the insulating disks 15 is provided a slot 16, whose dimensions are slightly greater than the dimensions of terminal 13. Insulating disks 15 are also provided with circular bores 17, corresponding to bores 14.

Disks 11, 15 are alternately placed on a cross-sectionally circular insulating tube 18 in such a way that the sides of disks 11 on which the terminals 13 are located all point to the same side. A disk 15 is always placed between said disks 11 in such a way that the slot 16 comes to rest in the vicinity of terminal 13 of disk 11 already placed on insulating tube 18. The connecting lines 12 of the disk stack are arranged in a row.

Connecting lines 3 and 12 are preferably made in each case from a varnished copper wire, which also applies to the following embodiments.

The casting around of the disk stack and the grinding thereof take place in the same way as described relative to FIG. 2.

In the embodiment of FIGS. 5 and 6, the conductive disks 18 and insulating disks 19 once again have hexagonal bores 20 and 21. The insulating tube 22 also has a hexagonal cross-section.

In each case, a connecting lug 12 is soldered at 13 to the edge of one side of the conductive disks 18. Each of the insulating disks 19 is provided with an edge slot 16, whose size is slightly larger than that of the dimensions of terminal 13. Disks 18 are placed on insulating tube 22 in such a way that the terminals 13 of adjacent disks 18 are in each case displaced by 60° from one another. The intermediate insulating disks 19 are in each case placed on the disk 18 already located on tube 22 in such a way that the slot 16 comes to rest over terminal 13.

This leads to two rows of connecting lines 12, 12', which are displaced by 60° relative to one another and in which, considering the sequence of the disks, connecting lines 12 are associated e.g. with each uneven disk 18 and lines 12' e.g. with each odd disk 18' of the stack.

In the embodiments of FIGS. 7 and 8, the disks are in the form of composite disks, in which a metal layer is applied to one side of a rigid plastics foil. On the edge of said composite disks 23 is provided a slot 24. Once again, the disks 23 have a hexagonal bore 25. A connecting line 27 is soldered or welded at 26 to the metal-lined side and is staggered relative to slot 24 in each case. As can be gathered from FIG. 7, terminals 26 are displaced in one case to one side and in the other case to the other side with respect to the slots 24. However, in each case the displacement has the same angular measurement.

Disks 23 are now placed on a hexagonal insulating tube 28 in such a way that the slot 24 of the disk 23 to be fitted comes to rest over the terminal 26 of an already fitted disk 23. Thus, this means that in the case of disks 23 terminals 26 are alternately arranged to the left and right of slot 24. This gives a disk stack in which terminals 26 and consequently lines 28 of disks 23 are arranged in alternately displaced manner.

In the fifth embodiment according to FIGS. 9 and 10, the electrically conductive disks 1 correspond to those of FIGS. 1 and 2, except that the bores 29 are circular. Insulating disks 30, which also have a circular bore 29' have an external diameter corresponding to the radial spacing of connecting lug 2 with respect to the centre of bore 29. On the edge of insulating disks 30 is provided a slot 31, whose dimensions slightly exceed those of the terminal 32 of connecting line 33 on connecting lug 2. Disks 1 and 30 are alternately placed on an insulating tube 18 in such a way that the slots 31 in each case come to rest in the vicinity of terminal 32 of disks 1 already placed on tube 18. As in the case of the other embodiments, disks 1 are fitted in such a way that in the fitted state terminals 32 always point to the same side of the stack.

In the embodiment according to FIGS. 11 and 12, the conductive disks 1 are identical to the conductive disks of FIGS. 1 and 2. Insulating disks 34 correspond to those of FIGS. 9 and 10 with the exception that the central bore 35 is once again hexagonal, like bores 4. Disks 1 and 35 are alternately placed on an insulating tube 22, as described in connection with FIGS. 5 and 6.

In all the embodiments, the insulating and conductive disks are produced by punching out. The central bores 4, 6, 20, 21, 25, 35 can also be made circular. However, if the fitting of the disks takes place in a displaced manner, the cross-section of the bores and of the insulating tube preferably has many sides and the spacing is selected as a function of the displacement. If in operation wear and/or burning off occur on surface 9, this can be eliminated by regrinding.

I claim:

1. A multiple electrode apparatus comprising a stack of alternately arranged electrically insulating plates and electrically conductive plates, the insulating plates being in the form of substantially identical discs as are the conductive plates, each disc having a bore and being mounted on an electrically insulating mounting member, the discs being pressed together on the member by end pressure plates, and said stack being cast in a block of synthetic resin having one side surface-ground up to the conductive discs.

2. A multiple electrode apparatus as claimed in claim 1 in which the conductive discs have connection lugs.

3. A multiple electrode apparatus as claimed in claim 2 in which the connection lugs of adjacent conductive discs are angularly displaced from each other around the mounting member.

4. A multiple electrode apparatus as claimed in claim 2 or claim 3 in which the insulating discs have a radius corresponding to the radius of the connecting lugs and have an edge slot in the vicinity of a terminal point of a connecting conductor on each of the lugs.

5. A multiple electrode apparatus as claimed in any one of claims 1 to 4 wherein the conductive discs are made from steel and the insulating discs from an epoxy resin.

6. A multiple electrode apparatus as claimed in any one claim 1 to 4 in which the mounting member has a polygonal cross-section and the disc bores are of co-operating shaped polygons, adjacent conducting discs being displaced angularly by an amount corresponding to at least one of the sides of the polygon.

7. A multiple electrode apparatus as claimed in claim 6 in which the conducting discs are connected by conductors to a pressure plate.

8. A multiple electrode apparatus as claimed in claim 1 in which connecting conductors are each located at a terminal point directly on the edge of one side of the conductive discs and each of the insulating discs has an edge slot in the vicinity of the terminal point on an adjacent disc.

9. A multiple electrode apparatus as claimed in claim 8 in which the terminal points of the connecting conductors are arranged in one or more axially extending rows.

10. A multiple electrode apparatus as claimed in claim 8 in which the terminal points of the connecting conductors of adjacent conductive discs are angularly displaced from each other around the mounting member and the edge slot of the intermediate insulating discs between any two conductive discs is located in the vicinity of the terminal point of the conductive disc immediately previous to it in the stack.

11. A multiple electrode apparatus as claimed in claim 10 in which the terminal points of the connecting conductors of adjacent conductive discs and the edge slots of adjacent insulating discs are alternately arranged in at least two axially extending rows.

12. A multiple electrode apparatus as claimed in any one of the preceding claims 8, 9 or 11 in which a conductive disc and an insulating disc are combined to form a composite member having an edge slot and whose conductive side is displaced with respect to the slot of the terminal point for the connecting conductor.

13. A multiple electrode apparatus as claimed in claim 12 in which adjacent composite members are angularly displaced from each other around the mounting member, the slot of the first member being positioned in the vicinity of the terminal point for the connecting conductor of an adjacent member.

* * * * *